Figure 11:
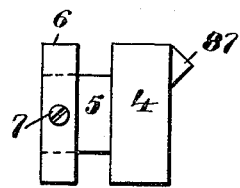
Figure 12:
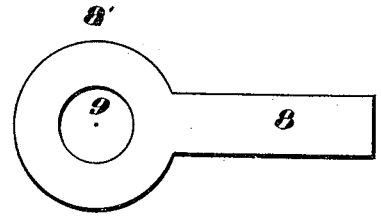
Figure 13:
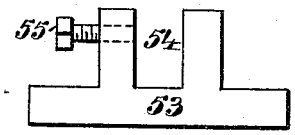

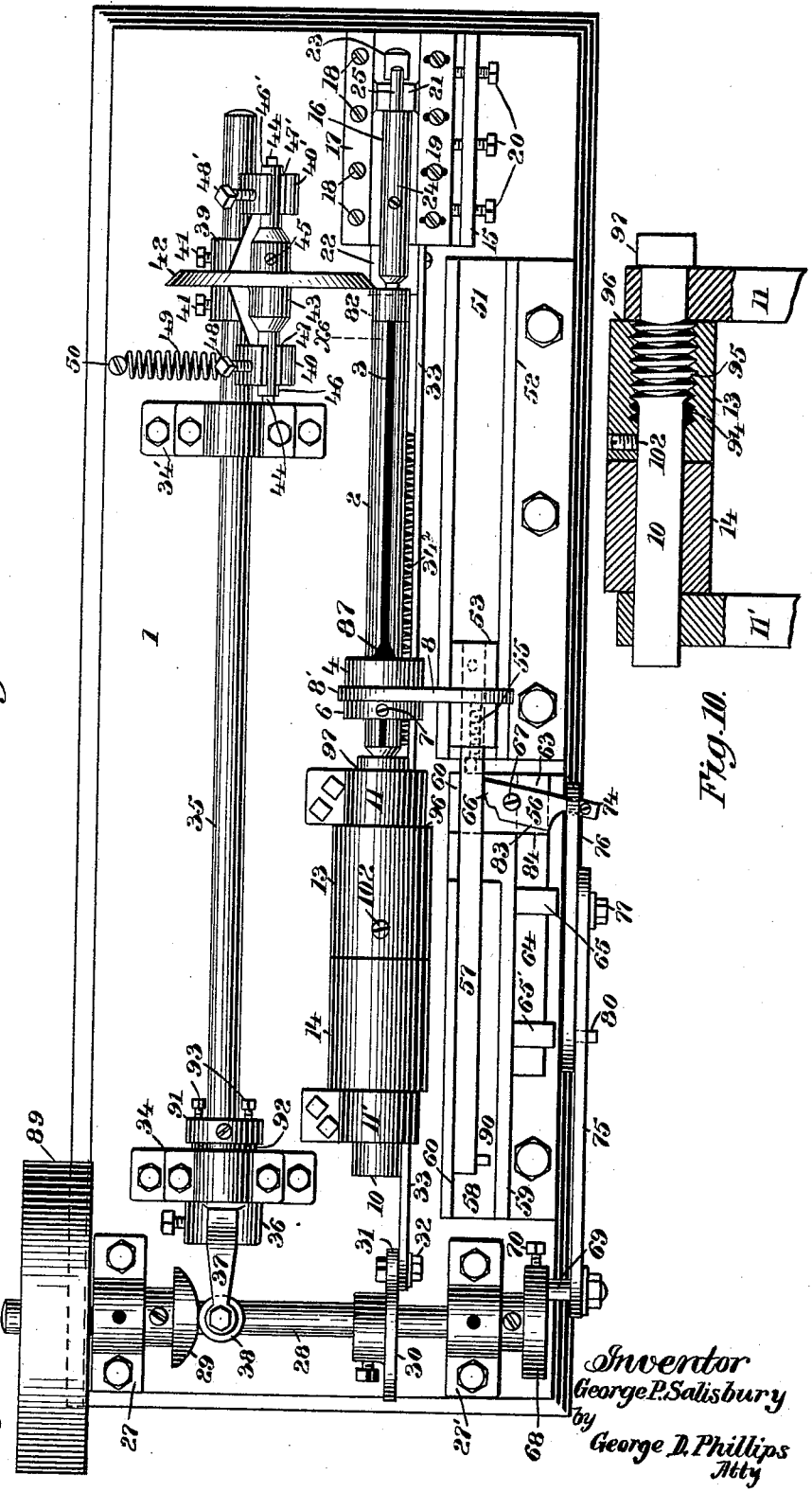

(No Model.) 4 Sheets—Sheet 2.
G. P. SALISBURY.
MACHINE FOR CUTTING PAPER TUBES.
No. 447,740. Patented Mar. 3, 1891.
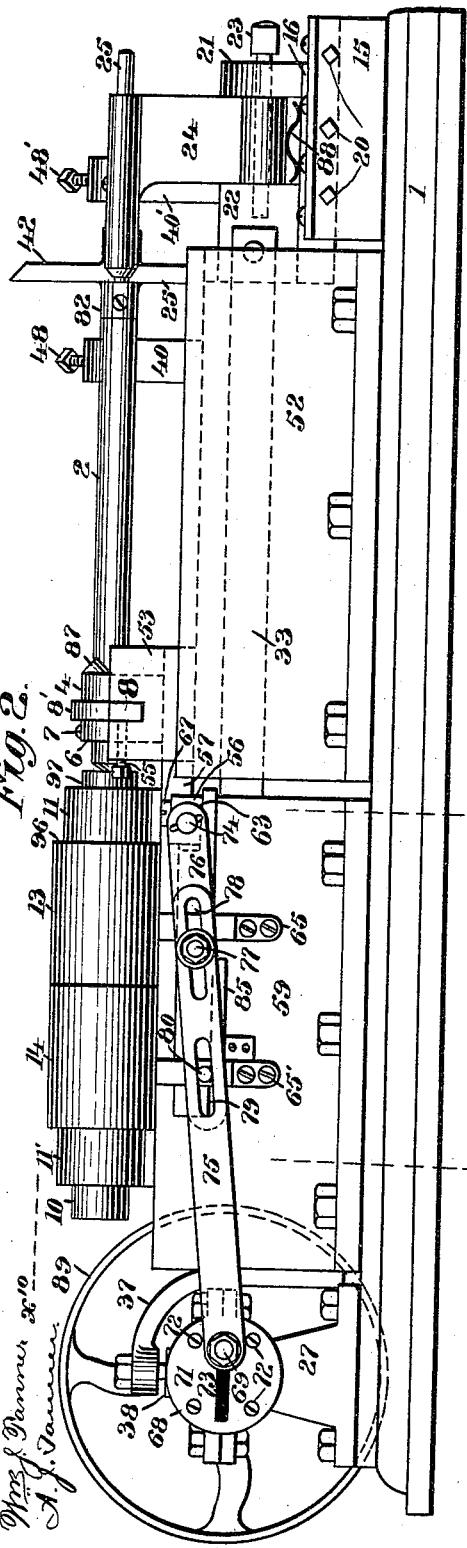
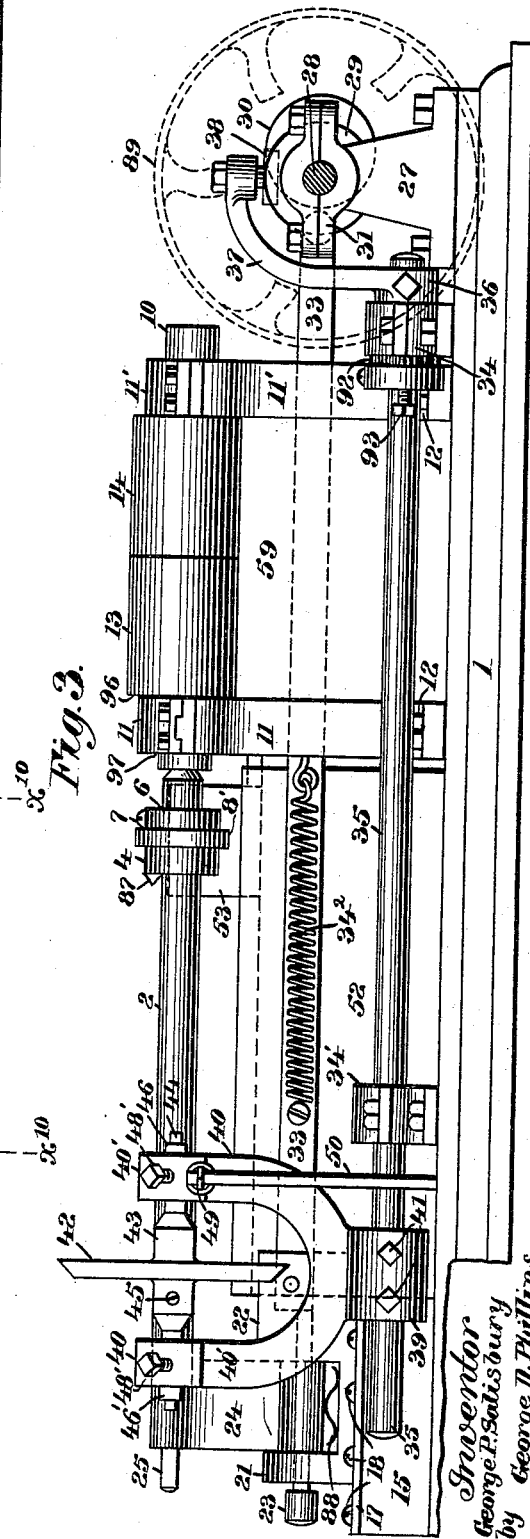

(No Model.) 4 Sheets—Sheet 3.
G. P. SALISBURY.
MACHINE FOR CUTTING PAPER TUBES.
No. 447,740. Patented Mar. 3, 1891.
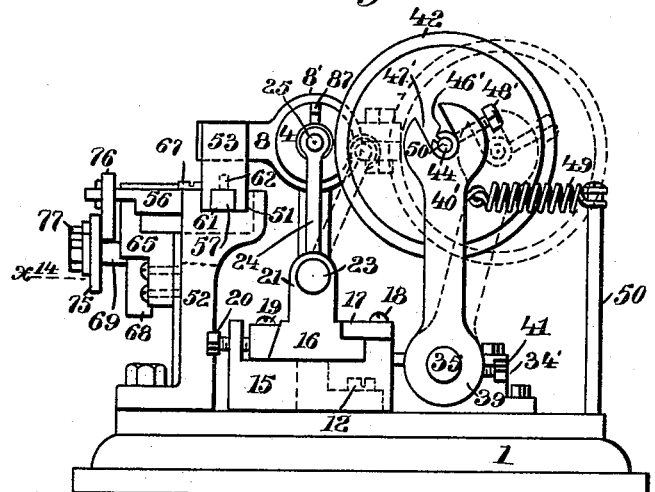
Fig. 4.
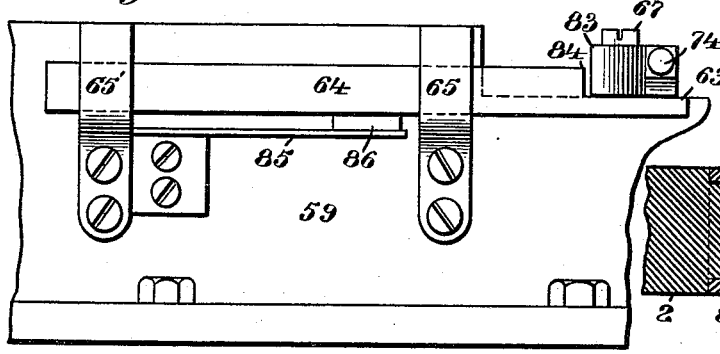
Fig. 5.
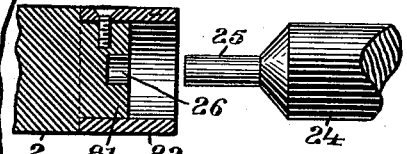
Fig. 6.
Fig. 7.
Fig. 8.
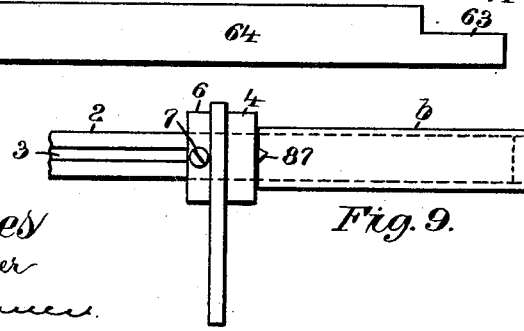
Fig. 9.
Witnesses
Wm. J. Tanner
A. J. Tanner
Inventor
George P. Salisbury
by George D. Phillips
Atty.

(No Model.) 4 Sheets—Sheet 4.
G. P. SALISBURY.
MACHINE FOR CUTTING PAPER TUBES.

No. 447,740. Patented Mar. 3, 1891.

Witnesses
Wm. J. Tanner
A. J. Tanner

Inventor
George P. Salisbury
by
George D. Phillips
Atty.

UNITED STATES PATENT OFFICE.

GEORGE P. SALISBURY, OF NEW HAVEN, CONNECTICUT, ASSIGNOR TO EUGENE K. PLUMLY, OF PHILADELPHIA, PENNSYLVANIA.

MACHINE FOR CUTTING PAPER TUBES.

SPECIFICATION forming part of Letters Patent No. 447,740, dated March 3, 1891.

Application filed October 3, 1890. Serial No. 366,974. (No model.)

*To all whom it may concern:*

Be it known that I, GEORGE P. SALISBURY, a citizen of the United States, residing at New Haven, in the county of New Haven and State of Connecticut, have invented certain new and useful Improvements in Machines for Cutting Paper-Tubes; and I do declare the following to be a full, clear, and exact description of the invention, such as will enable others skilled in the art to which it appertains to make and use the same, reference being had to the accompany drawings and to the figures of reference marked thereon, which form a part of this specification.

My invention relates to certain novel and useful improvements in machines for cutting or dividing tubes of paper, straw-board, wood pulp, or other substances into bands or rings of any required size, the same being used for the body portion of pill-boxes and like packages.

The object of my invention is to produce a machine whereby the feeding of the tube, the engagement of the cutter therewith, and the support of the tube-carrying arbor are automatically operated; and with these ends in view my invention consists in the details of construction and combination of elements hereinafter fully explained and particularly pointed out in the claims.

In order that those skilled in the art to which my invention appertains may fully understand its construction and method of operation, I will describe the same in detail, reference being had to the accompanying drawings, which form a part of this specification, and in which—

Figure 1 represents a plan view of the machine; Fig. 2, a front side elevation; Fig. 3, a rear side elevation; Fig. 4, a front end elevation; Fig. 5, a side elevation and broken section of the frame. Figs. 6, 7, 8, 9, 10, 11, 12, 13, 14, and 15 represent detail views.

Its construction and operation are as follows: 1 represents the bed of the machine, which is preferably supported upon any suitable legs, (not shown;) 2, tube-carrying arbor, having the longitudinal groove or keyway 3 therein; 4, tube-carrier or sleeve having a cylindrical bore. Said carrier is mounted on the tube-arbor 2 and is arranged to have a free longitudinal movement thereon; 5, a reduced portion (see Fig. 11) of carrier 4, and upon such reduced portion is mounted the collar 6, such being held thereon by the screw 7, which screw passes through said collar and reduced portion 5 of the carrier 4, and its end enters the groove 3 of arbor 2. This enables the carrier 4 to revolve with such arbor.

8 is an arm having enlarged portion 8' and the hole 9 therein, (see Fig. 12,) and is loosely mounted on the reduced portion 5 of the carrier 4, and is held in place by means of the collar 6; 10, driving-spindle carrying the arbor 2, said spindle journaled in the standards 11 11', which standards are bolted to the bed 1 by bolts 12.

13 and 14 are tight and loose pulleys mounted on the spindle 10.

The block 15, rigidly mounted on the bed 1, (see Fig. 4,) has its upper portion recessed to receive the frame 16, which frame is retained in the recess of the block 15 by means of the cap 17, screws 18, gib 19, and adjusting-screws 20. Such frame is arranged to have a free longitudinal movement in the block 15. Between the uprights 21 and 22 of block 15 and supported upon pin 23 in such uprights is the tube-arbor-center support 24. Placed longitudinally through the upper portion of such support is the center pin 25, which pin engages the center 26 of the tube-arbor. (See Fig. 6.) Journaled in the standards 27 27', (see Fig. 1,) (which standards are mounted on the bed 1) is the shaft 28, having thereon the cams 29 and 30. The cam 30 engages roll 31, which roll is journaled on stud-screw 32 of the bar 33. Such bar extends forward and connects to the upright 22 of the center sliding frame 16. Such bar (see also Fig. 3) is also supported in the standards 11 11'. The spring $34^2$, one end of which is attached to the standard 11 and the other end to the bar 33, operates to preserve the engagement of roll 31 with the cam 30. Also supported on bed 1 are the standards 34 34', and in such standards is journaled the rocker-shaft 35. Mounted on the end of such shaft is the hub 36, having the curved arm 37, which arm carries the roll 38, which roll engages the cam 29. Mounted on the opposite end of the rocker-shaft 35 is the cutter-support having hub 39 and branches 40 40'. Such support is attached to said rocker-shaft by means of screws 41, as shown, or in any other suitable manner that will enable the position of such support to be shifted as may be required. (See also Fig. 3.) The beveled-edge rotary cutter 42 is rigidly mounted upon the sleeve 43, which sleeve and cutter are in turn supported upon the spindle 44 and rigidly secured thereto by the screws 45. The split bushings 46 46' are placed one on each end of the spindle 44, and such bushings are also supported within the forked openings 47 47' of the arms or branches 40 40' of the cutter-support (see also Fig. 4) and said bushing held therein and the proper tension placed on spindle 44 by means of the screws 48 48'. The proper relation of the edge of the cutter 42 with the end of the tube-arbor 2 is regulated by the longitudinal movement of the bushings 46 46' in the cutter-support. The inner ends of such bushings are brought as closely to the sleeve 43 as will permit such sleeve, cutter, and its spindle to turn freely and yet allow of no end-play. The coiled spring 49, one end of which is attached to the cutter-support and its other end to the stud 50, serves to keep roll 38 always in contact with cam 29. The groove 51 of the frame 52 (see Figs. 1 and 4) is provided for the tube-carrier block 53 to slide therein. The groove 54 (see also Fig. 13) is provided in such carrier-block to receive the carrier-arm 8, such arm being held therein by screw 55.

The movement of the carrier-block 53 is effected by means of the friction-dog 56 and bar 57 in the following manner: The bar 57 is placed in the groove 58, which groove is formed in the upper surface of the frame or standard 59, Fig. 1, such bar resting on the bottom of groove 51 of the frame 52, the bottom surfaces of such grooves being on a line with each other. The bar is made preferably square, although any form may be used, and the square open groove 61 (see also Fig. 4) is provided in the bottom surface of the carrier-block 53 to admit such bar. The pin 62 (see also Figs. 4 and 7) projects above the surface of the bar and enters a hole in the block, (not shown,) and by means of such engagement of the pin with the carrier-block the movement of such block is controlled by the bar. The feed-dog 56 is supported upon the enlarged angular projection 63 of the bar 64. (See Figs. 7 and 8.) The brackets 65 65' support the bar 64 to the frame 59, such bar moving freely therein.

A step-by-step motion is imparted to the carrier-block 53 by means of the alternate engagement of the face 66 of the feed-dog 56 with one side of the feed-bar 57, aided by the resistance offered by the perpendicular face of the upright 60 of the projecting end 63 of bar 64. The engagement of the feed-dog with the bar 57 is brought about in the following manner: The feed-dog is attached to bar 64 by means of the screw 67 turning freely thereon. Such screw is placed eccentrically with the face 66 of the feed-dog, Fig. 7, so that such face will readily engage with and disengage from bar 64. Motion is imparted to the feed-dog by means of a well-known form of construction for obtaining an eccentric motion, which consists of the face-plate 68, (see Figs. 1 and 2,) which plate is mounted securely on the end of shaft 28. Such plate has a diametrical groove or slot formed therein, (not shown,) and at right angles to the axis of the shaft 28 into this groove is fitted a sliding block, (not shown,) and to such block is rigidly secured the laterally-projecting stud 69. This sliding block is moved to and from the center by means of the screw 70 projecting through the outer rim of the face-plate 68, Fig. 1.

The perpendicular face of the plate 68 is covered by the cap 71 and held thereto by screws 72, Fig. 2. The diametrical clearance-slot 73, formed in cap 71, allows a free unobstructed movement to stud 69. Journaled on stud 69 and the projection 74 of feed-dog 56 are the adjustable connecting-bars 75 76, held together by means of the threaded end of the screw 77 engaging a threaded hole in bar 76, and the head of such screw engaging the surface of the bar 75, the slot 78 in bar 76 for screw 77, (see Fig. 2,) and the slot 79 in such bar for the steady-pin 80, which pin projects laterally from the bar 76 and enables the distance between the stud 69 of the face-plate 68 and the feed-dog 56 to be lengthened or shortened, as required. The reciprocating movement of the combined connecting-bars 75 and 76 will cause the feed-dog 56 to oscillate on the screw 67, and thereby cause the face 66 of such dog to alternately engage with and disengage from the bar 57, and will also cause such bar, together with the carrier-block 53, to move forward a distance proportionate to the eccentric position of the stud 69 in the face-plate 68. The return movement of the face-plate 68 will release feed-dog 56 from its contact with bar 57, causing such dog to swing on screw 67 until the edge 83 engages with the shoulder 84 of the bar 64, Fig. 7, when such bar, together with the feed-dog 56 thereon, will be returned to its former position in readiness to re-engage with the feed-bar 57 through the medium of the feed-dog, as before mentioned, carrying such feed-bar and tube-carrier sleeve 4, with which such bar is connected, another step forward, and this alternating movement will continue until the tube-carrier sleeve 4 is moved to the extreme end of the tube-supporting arbor 2. The friction-spring 85, (see Fig. 5,) attached to frame 59, having the pad 86, resting against the under side of bar 64, will act as a check on such bar and prevent any lost motion in its reciprocating action. On the reduced portion 81 (see Fig. 6, which is a sectional view of the end of tube-carrying arbor 2 and a section through $X^6$ of Fig. 1) is placed the hardened-steel shell or ring 82, and it is arranged that the edge of the cutter 42 and the end face of shell 82 shall engage as close as possible without being brought into actual contact. (See Fig. 1.)

The operation of the machine is as follows: When the center pin 25 is released from the arbor 2, as shown in Figs. 6 and 9, the center support is swung on its pin 23 out of line with the tube-carrying arbor 2, as shown by dotted position of such support in Fig. 4. The tube-carrier 4 in the meantime is placed at the opposite end of the arbor 2, as seen in Figs. 1 and 2. An uncut paper tube is then placed on such arbor and firmly against the sharp edge of the dog 87 of the carrier 4. The center support 24 is thrown in line with the axis of the arbor 2 and held there by means of the friction-spring 88 beneath such support, or in any other suitable manner. Motion is imparted to the shaft 28 and spindle 10 by pulleys 13 and 89. The length of the rings to be cut from the tube will be determined by the throw given to the face-plate 68. The forward throw of such face-plate will, as before described, move the carrier 4 along the revolving arbor 2 the distance required to project the end $a$ of the tube $b$ over the end of such arbor, and such projecting end will represent the ring to be severed. (See also Fig. 9.) In the meantime the cam 30 will assume the position shown in Fig. 1, and by the action of spring 34 and bar 33 the center pin 25 will be brought into engagement with the center 26 of arbor 2 in time to support such arbor against the cutting strain. The cam 29 will by its engagement with roll 38 turn shaft 35, as before described, and by such action carry the cutter 42 forward to engage the tube. The revolving tube will also impart a rotary motion to such cutter. The spring 49 will always keep roll 38 engaged with cam 29, and will therefore cause cutter 42 to assume the dotted position shown in Fig. 4 while the tube is being carried forward. The reverse motion of cam 30 will carry center pin 25 out of engagement with arbor 2 (see Fig. 9) far enough to permit the severed ring to fall free from the arbor and center pin, when such center pin, by the action of the cam, will again be brought into engagement with the tube-carrying arbor and the tube fed forward in readiness for the cutter, as before, and this operation is continued until the tube has been fed forward and cut up. It is necessary that the forward movement of the carrier 4 should cease after the tube has become exhausted and such carrier not brought into the field of the cutter, otherwise the cutter would be ruined by contact with the hard surface of the carrier. To guard against this, the pin 90 (see Figs. 1 and 7) will occupy a position on bar 57, so that when the carrier has arrived at or near the end of the tube-arbor the pin 90 will strike the feed-dog 56, and the return movement of bar 64, which carries such feed-dog, will, by the engagement of the feed-dog and pin 90, carry bar 57 back the distance which bar 64 will travel on its return-stroke, and if the operator is absent the machine may continue to run and perform all of its motions as heretofore while the carrier is idly reciprocating back and forth near the end of the tube-carrying arbor. To place another tube on the arbor the shaft 28 is brought to a standstill in a position that will release bar 57 from contact with the feed-dog 56, when such bar and carrier 4 may be moved back in readiness for the forward movement, and this operation may be performed while the tube-carrying arbor is still in motion. It is absolutely necessary that the cutter 42 should run as close as practicable to the end of the tube-carrying arbor 4 without being brought into actual contact therewith. Therefore all end-play of the shaft 35 must be avoided. To accomplish this the collar 91 (see Fig. 1) is secured to such shaft, and the steel washer 92 (which washer loosely fits the same) is placed between collar 91 and standard 34, and the lost motion in the shaft 35 taken up by means of the adjusting-screws 93, which screws pass through threaded holes in collar 91, and their ends engage the washer 92, thus causing a slight frictional contact between washer 92 and standard 34. It is equally important that the end-play in the spindle 10 should be taken care of. This is done (see Fig. 10, which represents a sectional side elevation of the pulleys 13 and 14, also standards 11 11' through line $X^{10}$ of Fig. 2) by means of the interior threaded portion 94 of pulley 13, which engages the threaded portion 95 of the spindle 10. Such pulley is adjusted on said spindle until all lost motion between the end 96 of pulley 13 and shoulder 97 of spindle 10 is taken up against each side of the standard 11, when such pulley is held in place by screw 102.

Figure 14:
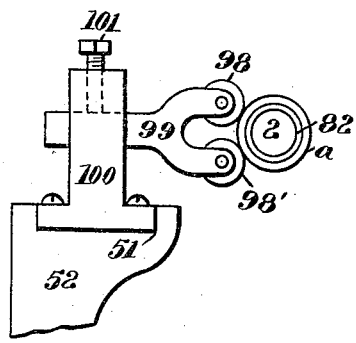
Figure 15:
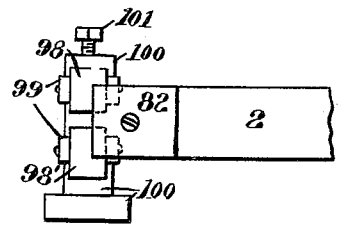

In cutting up tubes of different sizes different sizes of arbors are used, such arbor having a shank (not shown) which enters the driving-spindle. When necessary to cut small tubes, the support heretofore described for the free end of the arbor could not be used to advantage, as the center pin would be too frail to give the proper support against the cutting strain. In such case it would be advisable to support the arbor by engaging with the outer surface of the tube, using means whereby as little friction as possible is created. Therefore I prefer to employ the two rolls 98 98', (see Figs. 14 and 15,) although one might suffice. Such rolls being being independent of each other are journaled in the two branches of the holder 99, which holder is supported in the post 100, such post being rigidly supported to the frame 52. A section of such frame is shown in Fig. 14 through line $X^{14}$ of Fig. 4. The roll-support 99 is capable of being adjusted to and from the tube-arbor to bring the rolls in proper supporting engagement therewith, and when so adjusted the holder 99 is rigidly secured by means of the screw 101 of the post 100. I prefer to so arrange the rolls that the greater portion of their surface will project over the end of the arbor and engage the projecting end of the tube during the operation of cutting off the ring, while the remaining portion of the surface of such rolls will support the end of the tube-arbor through the medium of the outer surface of the tube. (See Fig. 15.) In this device the rolls do not come directly in contact with the surface of the arbor, but engage the tube only and with sufficient firmness to properly support the same and the arbor. The frictional contact of such rolls with the tube will also cause them to revolve with such tube and arbor. If found necessary, the rolls in their engagement with the tube may be actuated by spring-pressure, thereby accommodating themselves to any unevenness or varying thickness of such tube.

Another advantage to be derived by having the rolls support the ring under the shearing action of the cutter, especially in small tubes, is seen when such ring is nearly severed from the tube. When not supported and hanging by a small uncut portion of the surface, it is liable under the rapid centrifugal motion of the arbor to be thrown out of alignment with the body of the tube into the field of the cutter and thereby ruined; but supported by the rolls such ring will remain in alignment with the tube until completely severed therefrom, when it will drop into a receptacle provided to receive it.

In my invention I do not wish to be confined to the exact details of construction herein shown and described, since many changes not involving mechanical skill may be made therein without departing from the spirit of my invention as set forth in the claims.

What, therefore, I claim as new, and desire to secure by Letters Patent, is—

1. The combination, in a tube-cutting machine of the character described, of the arbor 2 for supporting the tube to be cut, and means, substantially as shown, for revolving such arbor, tube-carrier sleeve 4, mounted on such arbor, and means, substantially as shown, whereby a rotary motion is imparted to such tube-carrier sleeve through the medium of the tube-supporting arbor, and means, substantially as shown, whereby such carrier-sleeve engages with the inner end of the tube, causing such tube to revolve with the carrier-sleeve and arbor, and means, substantially as shown, to advance such tube-carrier sleeve during its rotary motion and independent of such motion along the tube-supporting arbor, such carrier sleeve halting in each advanced position of its forward movement during the operation of cutting the tube, combined with a cutter for severing such tube, as set forth.

2. In a tube-cutting machine, the combination, with an arbor for supporting the tube to be cut, and means for rotating such arbor, a tube-carrier mounted on such arbor and arranged to rotate therewith, and means for imparting an alternating or step-by-step movement to such carrier parallel with the axis of such arbor, a support for the free end of such arbor, and means whereby such support is automatically brought into engagement with such arbor to support it against the cutting strain and disengage it therefrom, of a cutter, a support for the same, and means for advancing such cutter toward such arbor and withdrawing it therefrom, as described.

3. In a tube-cutting machine, the combination, with an arbor for supporting the tube to be cut, of a tube-carrier mounted on such arbor, and means, substantially as shown, whereby a rotative motion is imparted to such arbor and carrier, and means, substantially as shown, for imparting a step-by-step movement to such carrier longitudinally along such arbor, and means, substantially as shown, to check the forward movement of such carrier beyond a predetermined point, an automatically-operated support, arranged substantially as shown, to engage the free end of such arbor and support the same against the cutting strain and be withdrawn therefrom when such cut is completed, a cutter, a support for the same, and means, substantially as shown, for advancing such cutter toward such arbor and withdrawing the same, substantially as set forth.

4. In a tube-cutting machine, the combination of the following parts, to wit: a tube-supporting arbor and means for imparting a rotative motion thereto, a tube-carrier mounted on such arbor and arranged to rotate therewith, and means, substantially as shown, to impart a step-by-step motion to such carrier along such arbor, and means to check the further movement of such carrier at a predetermined point on such arbor, a support for the free end of such arbor, an independent driving-shaft supported from the bed, a cam mounted thereon, and means, substantially as shown, to connect such cam with such arbor-support, whereby such support is caused to engage with and disengage from such arbor at the proper time, a rocker-shaft, supports for the same, and means provided on such shaft to engage a cam mounted on the driving-shaft, a cutter-frame carrying a cutter mounted on such rocker-shaft, and by means of such cam on the driving-shaft such cutter is caused to advance and retreat from the tube-arbor at the proper time required, substantially as set forth.

5. In a machine of the character described, the combination, with the tube-supporting arbor 2, of the frame 16, a support for such frame, and means, substantially as shown, whereby such frame is moved longitudinally thereon to and from the tube-supporting arbor, arbor center support 24, pivotally supported to such frame in the manner substantially as shown, and means, substantially as shown, on such tube-arbor center support to engage with the tube-arbor, such tube-arbor center support arranged, when disengaged from the tube-arbor, to be swung laterally on its pivoted support out of alignment with such arbor, substantially as set forth.

6. The combination, in a tube-cutting machine, of the arbor of the character described, of the arbor 2 and means, substantially as shown, to revolve the same, tube-carrier sleeve 4, mounted on such arbor, and means, substantially as shown, for imparting a rotary motion to such tube-carrier sleeve through the medium of the tube-supporting arbor, with the arm 8, one end of which arm loosely engages the tube-carrier sleeve, substantially as shown, carrier-block 53 to engage with the other end of such arm, a guiding-track for such carrier-block, such track arranged parallel with the tube-supporting arbor, and means, substantially as shown, to advance such tube-carrier block step by step along such track, and thereby impart such motion to the tube-carrier sleeve through the medium of the connecting-arm, as set forth.

7. The combination, in a tube-cutting machine, of the tube-supporting arbor 2, having longitudinal groove 3 therein, and means, substantially as shown, to revolve such arbor, with the tube-carrier sleeve 4, mounted on such arbor, such sleeve having a reduced portion, arm 8, one end of which arm loosely engages such reduced portion, collar 6, rigidly mounted thereon to hold such arm in place, and means, substantially as shown, to engage such tube-carrier sleeve with the longitudinal groove of the tube-arbor, whereby such sleeve is revolved with such arbor, and means, substantially as shown, connected with the free or projecting end of the arm to advance the tube-carrier sleeve longitudinally along the tube-arbor, substantially as shown.

8. In a machine of the character described, the combination, with an arbor for supporting the tubes to be cut, a tube-carrier mounted on such arbor, and means to rotate such carrier and arbor together, of a bar arranged parallel with such tube-carrying arbor, a support for such bar, and means, substantially as shown, for connecting such tube-carrier with such bar, a feed-dog, a support for the same, such feed-dog pivoted to such support and arranged by means of reciprocating mechanism to turn on such support and by frictional contact engage such bar and advance with the same a predeterminal distance and by means of the reciprocating mechanism such feed-dog, together with its support, will be returned to its former position independent of the feed-bar, as set forth.

9. In a tube-cutting machine, the combination, substantially as shown, with an adjustable reciprocating mechanism and means for operating the same, of a bar, a support for the same, a feed-dog, a support for the same, such feed-dog pivoted thereto, and means for connecting such feed-dog with the reciprocating mechanism, whereby such feed-dog is turned on its pivoted support and by frictional contact is made to alternately engage such bar and move with the same a predetermined distance, a stop on the feed-dog support to engage such feed-dog when released from said bar, so that by means of such stop, combined with the reciprocating mechanism, such feed-dog and its support are both returned to their former position, as set forth.

10. The combination, in a tube-cutting machine of the character described, of an arbor for supporting the tube to be cut and means to revolve such arbor, a tube-carrier sleeve mounted thereon, such carrier-sleeve caused to revolve with such arbor and through the medium of the same, with a feed-bar and means, substantially as shown, for connecting such feed-bar with the tube-carrier sleeve, a feed-dog, a support for the same, such feed-dog pivoted thereto, a projection on such support, the feed-bar placed between such projection and the clamping-face of the feed-dog, such dog arranged by means of the reciprocating mechanism connected therewith, substantially as shown, to turn on its pivoted support and by frictional contact engage the feed-bar, and while thus engaged and through the medium of the reciprocating mechanism such feed-dog, its support, and feed-bar, together with the tube-carrier sleeve, will be advanced a predetermined distance, a stop on such feed-dog support to engage the feed-dog when released from the feed-bar, and by means of such stop, combined with the reciprocating mechanism, such feed-dog and its support are returned to their former position independent of the feed-bar, substantially as set forth.

11. The combination, in a tube-cutting machine of the character described, of a tube-supporting arbor and means for revolving the same, a tube-carrier sleeve mounted thereon, and means, substantially as shown, on such arbor whereby such carrier-sleeve is revolved with such arbor and through the medium of the same such carrier-sleeve engaging the end of the tube to be cut, causing such tube to revolve with such arbor and carrier-sleeve, a cutter, a support for the same, and means, substantially as shown, to bring such cutter into engagement with such tube, with a feed-bar and means, substantially as shown, for connecting such feed-bar with the tube-carrier sleeve, a feed-dog, a support for the same, such feed-dog pivoted thereto, a projection on such support, the feed-bar placed between such projection and the clamping-face of the feed-dog, reciprocating mechanism connected with such feed-dog, causing the same to alternately engage the feed-bar and advance such feed-bar, the feed-dog, and its support, together with the tube-carrier sleeve, a predetermined distance, and a stop or check, substantially as shown, on such a feed-bar to engage the feed-dog and thereby prevent the tube-carrier advancing within the cutting-field, all substantially as set forth.

12. The combination, in a tube-cutting machine of the character described, of the driving-spindle 10, having shouldered portion 97 and threaded portion 95, standards 11 11' for supporting such spindle, pulley 13, mounted on such spindle, such pulley having threaded portion 94 to engage with the threaded portion of the spindle, standard 11, placed between the face 96 of said pulley and the face of the shouldered portion of the spindle, as shown, said spindle having the tube-supporting arbor 2 projecting therefrom, combined with the cutter 42, so that by means of the adjustment of the pulley on the spindle the proper relation between the edge of the cutter and the end of the tube-supporting arbor is maintained, and means, substantially as shown, whereby said pulley is rigidly secured to the spindle, as set forth.

13. The combination, in a tube-cutting machine of the character described, of the rocker-shaft 35, supporting-standards for the same, a cutter-support rigidly mounted on such shaft, a cutter in such support, with collar 91 rigidly mounted on such shaft, washer 92, loosely mounted thereon and placed between such collar and one of the supporting-standards or other suitable support for the same, screws 93, adjustably engaging with such collar, as shown, and projecting through the same, the projecting ends of which screws engage the washer, and by means of the collar, adjusting-screws, the washer, and its support, all combined and arranged as shown and set forth, the end-play of the shaft is taken up and the tube-cutter is held in proper relation with the tube-supporting arbor, as set forth.

14. The combination, in a tube-cutting machine, of the cutter 42, sleeve 43, such cutter rigidly mounted thereon, spindle 44, supporting such sleeve and cutter, split bushings 46 46' on the spindle, one of such bushings placed on each side of the cutter with the cutter-support 39, having branches 40 40', forked openings 47 47' therein to support the split bushings, and means, substantially as shown, whereby such bushings are held in such forked supports or openings and the tension on the spindle regulated thereby, the inner ends of such bushings abutting the cutter-sleeve and arranged to be adjusted laterally in their supports and thereby adjust the cutter with relation to the tube-supporting arbor, such spindle allowed to turn freely without end-play, as shown and set forth.

15. The combination, in a tube-cutting machine of the character described, of an arbor for supporting the tube to be cut and means to revolve such arbor, a tube-carrier sleeve mounted thereon, such sleeve revolved with such arbor and through the medium of the same, substantially as shown, such tube-carrier sleeve engaging one end of the tube to be cut, causing such tube to be revolved with such tube-carrier sleeve and arbor, a cutter, a support for the same, and means, substantially as shown, for advancing such cutter toward the arbor and withdrawing it therefrom, such cutter arranged to be revolved by the engagement of its cutting-edge with the revolving tube, and such cutter combined with the end of the arbor and form thereby a shearing cut to sever the tube, as set forth.

16. The combination, in a machine for cutting paper tubes, of a tube-supporting arbor and means, substantially as shown, to cause such arbor to revolve, a tube-carrier sleeve mounted thereon and arranged, substantially as shown, to be revolved with such arbor and through the medium of the same, such sleeve engaging with the inner end of the tube, thereby causing such tube to revolve with such sleeve and arbor, such tube-carrier sleeve arranged to be moved during its rotary motion and independent of such motion along the tube-supporting arbor and thus advance the tube into the cutting field, all substantially as set forth.

In testimony whereof I affix my signature in presence of two witnesses.

GEORGE P. SALISBURY.

Witnesses:
SIGMUND LOEWITH,
GEO. D. PHILLIPS.